Figure 1:
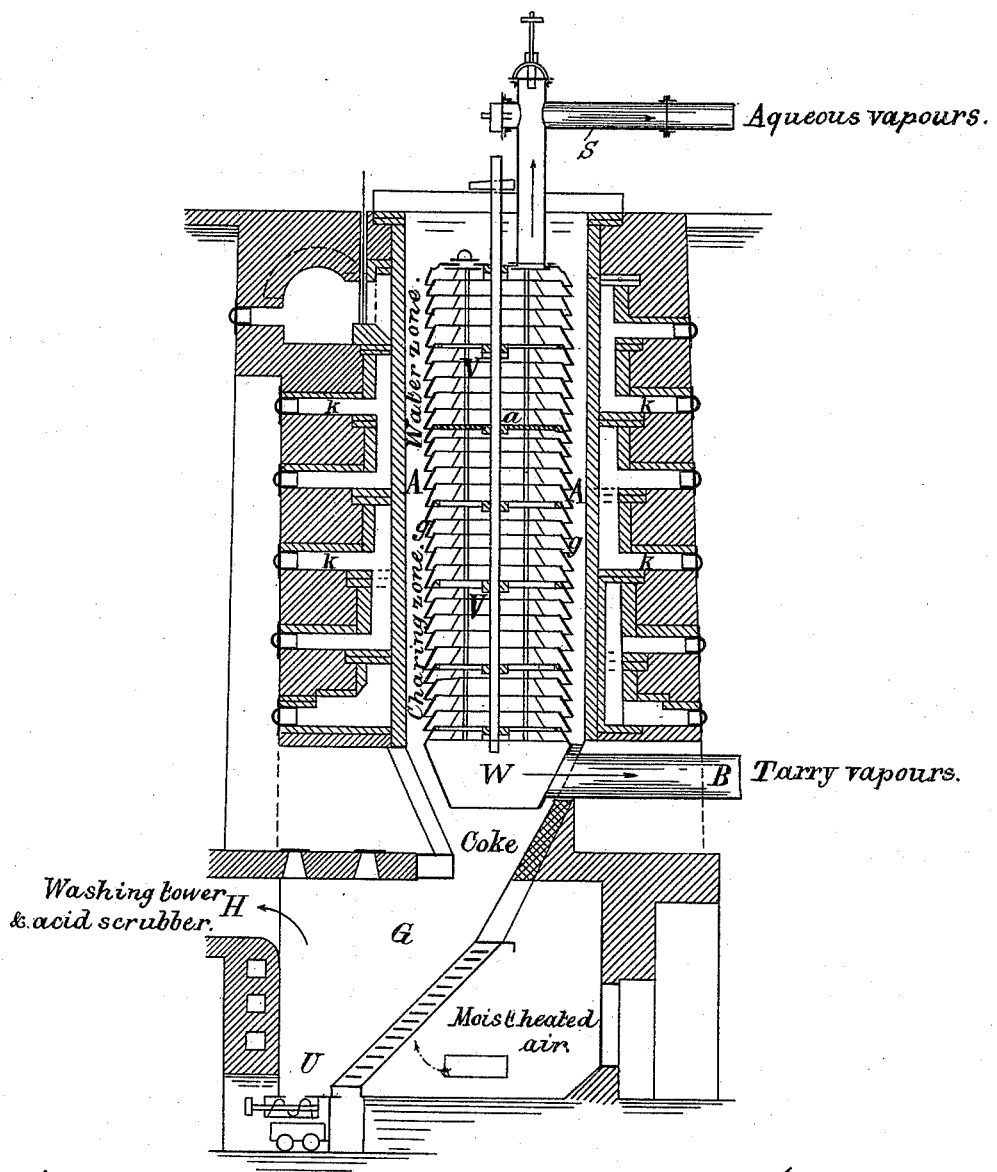

(No Model.) 4 Sheets—Sheet 1.

P. KUNTZE.
PROCESS OF AND APPARATUS FOR MAKING AMMONIA.

No. 488,207. Patented Dec. 20, 1892.

(No Model.) 4 Sheets—Sheet 2.
P. KUNTZE.
PROCESS OF AND APPARATUS FOR MAKING AMMONIA.
No. 488,207. Patented Dec. 20, 1892.
Fig. 2.a
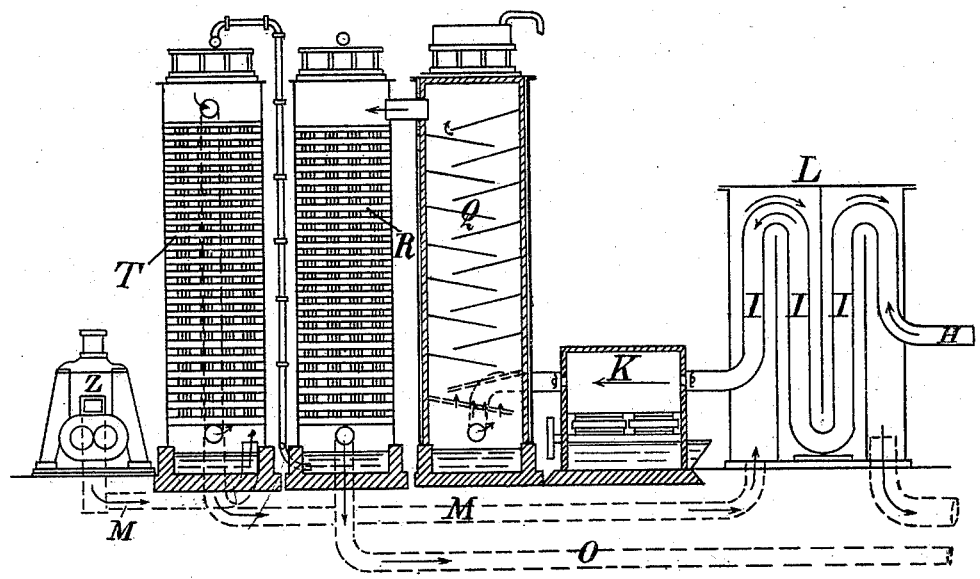
Fig 2.b.
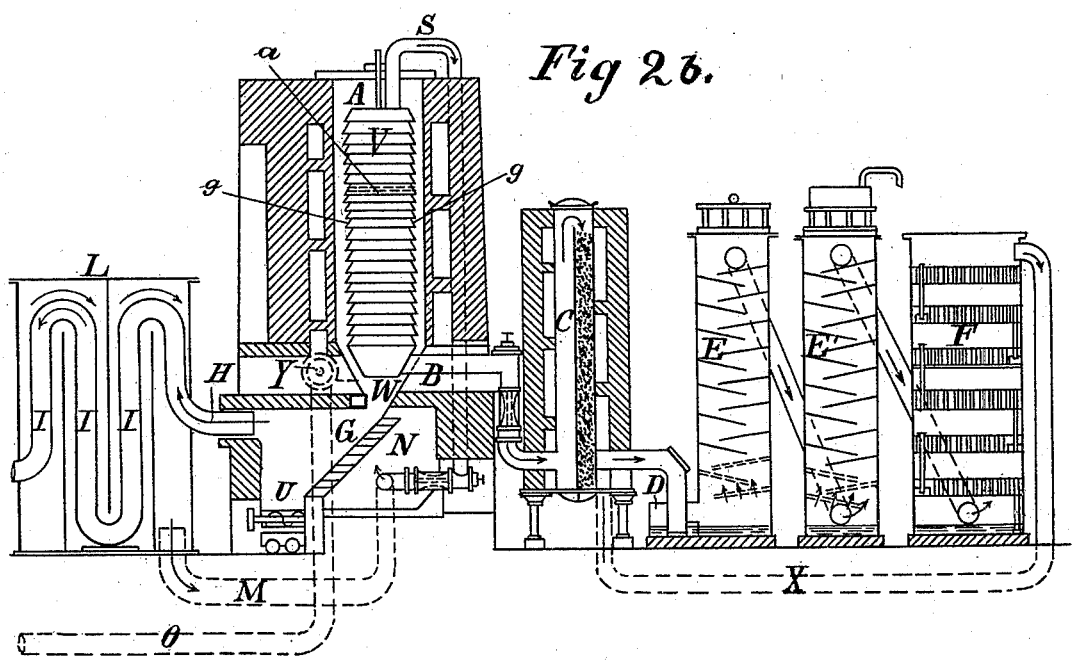
Witnesses:
J. W. Mister
Walter Allen
Inventor.
Paul Kuntze
by Herbert W. Jenner.
Attorney.

(No Model.) 4 Sheets—Sheet 3.
P. KUNTZE.
PROCESS OF AND APPARATUS FOR MAKING AMMONIA.
No. 488,207. Patented Dec. 20, 1892.
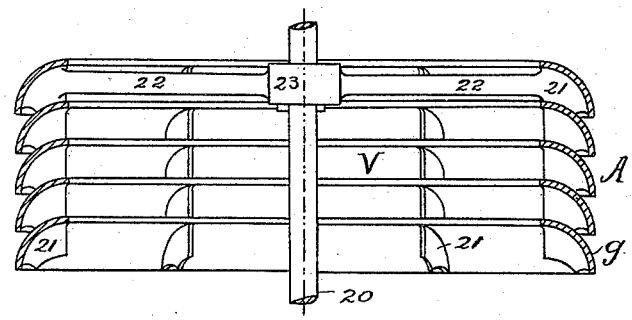
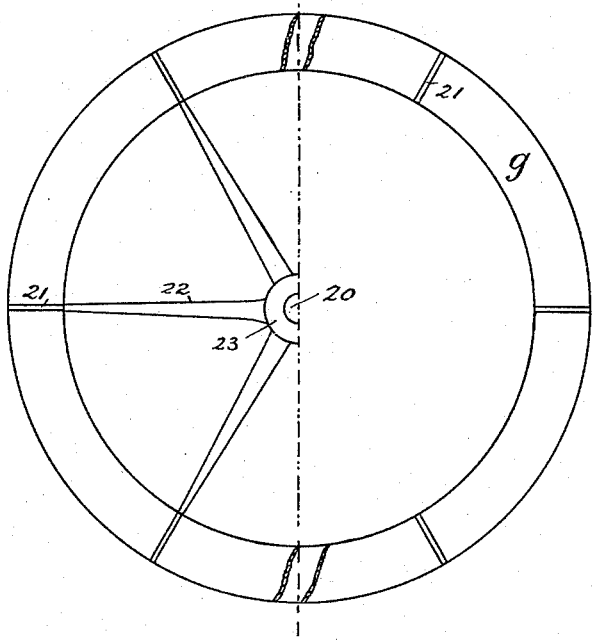

(No Model.) 4 Sheets—Sheet 4.

P. KUNTZE.
PROCESS OF AND APPARATUS FOR MAKING AMMONIA.

No. 488,207. Patented Dec. 20, 1892.

WITNESSES
Louis O. Thomason
Wm. H. Bates.

INVENTOR
Paul Kuntze.
BY his ATTORNEY
Herbert W. T. Jenner.

UNITED STATES PATENT OFFICE.

PAUL KUNTZE, OF ASCHERSLEBEN, GERMANY.

PROCESS OF AND APPARATUS FOR MAKING AMMONIA.

SPECIFICATION forming part of Letters Patent No. 488,207, dated December 20, 1892.

Application filed December 3, 1891. Serial No. 413,939. (No model.)

*To all whom it may concern:*

Be it known that I, PAUL KUNTZE, a subject of the King of Prussia and German Emperor, residing at Aschersleben, in the Kingdom of Prussia and German Empire, have invented certain new and useful Improvements in the Process of Manufacture of Ammonia and Tar from Nitrogenous Organic Substances and in Apparatus Relating Thereto; and I do hereby declare the following to be a full, clear, and exact description of the invention, such as will enable others skilled in the art to which it appertains to make and use the same.

The present invention relates to the manufacture of ammonia and tar from nitrogenous organic substances such as peat.

I have ascertained by means of many experiments that the nitrogen in organic substances and principally that contained in peat on charring is for the greatest part left behind in the coke. This is the case all the more, if the temperature of charring is kept as low as possible and if after driving off the tar, the raising of the temperature is avoided. The same effect is attained by preventing the aqueous vapors which are given off on charring the peat from acting on the hot organic substance in the furnace. The other portion of the original nitrogen escapes on charring in the shape of nitrites, organic bases of the pyrrol and pyridine-group, amines &c. The quantity of the organic nitrogen compounds formed increases with the progress of the dry distillation, and at the end of the latter, when after driving off the tar the temperature rises, nitrogen in the shape of cyanide of ammonium appears in considerable quantities. This compound is the product of the action of ammonia on carbon or carbonic oxide respectively, which is formed in this stage of the charring process in increasing quantities according to the following equation:

$$2NH_3 + C = NH_4CN + H_2.$$

At the same time ammonia escapes along with the tarry vapors during the progress of the dry distillation, although only in a relatively small quantity. The greater portion of the nitrogen is on charring left behind in the coke as fixed nitrogen, as previously mentioned.

By the present invention and the process described therein it becomes possible to convert into ammonia not only that portion of the total nitrogen which is left behind in the coke as fixed nitrogen but also that other portion which escapes during the charring process in the form of organic nitrogen compounds. The ash of the coke forms a very suitable substance for manure purposes, owing to its high percentage of lime and phosphoric acid and is incomparably more valuable than the ash of coal or brown-coal.

By keeping within the conditions previously mentioned the inventor succeeded in fixing the greater portion of the nitrogen of the peat in the coke during the charring process, whereby a separation of the nitrogen which is not recoverable as ammonia by dry distillation simply, from the tarry vapors is likewise brought about. The fixed nitrogen which remains after the charring in the coke can be converted into ammonia by gasifying the coke by means of air and steam, and this is the case all the more easy the lower the temperature of the peat was kept, during the charring process. The amount of steam required which is mixed with the air and serves along with the air for gasifying the coke must be nearly double the weight of the coke, so that the gasification of the coke takes place at the lowest temperature possible, which is yet sufficient to turn the coke into gas. The coke on burning yielding only permanent gases which are free from tar, the present process allows of the hot producer gases being deprived of their ammonia by acids, sulphuric acid for instance, a fact which technically is of the greatest importance, inasmuch as extensive and costly cooling towers for the large quantity of gases are not required. All that is necessary is a simple contrivance for mixing the hot gases with a fine spray of water for the purpose of cooling them down to 100° centigrade and freeing them from flue-dust, in order to deprive the gases of their ammonia in the acid scrubber, while on the other hand pure solutions of ammonium sulphate are recovered which become saturated by allowing them to run down the tower repeatedly. Whereas, as previously mentioned, the fixed nitrogen is only converted into ammonia in the presence of air and steam the conversion of the nitrogen which escapes during the charring in the shape of organic compounds into ammonia takes place in the absence of air by an igniting process in the presence of steam and large surfaces of hot, porous, fire-proof substances, which support the pyrogene reaction all the more efficiently the more calcareous they are. Both kinds of recovering the ammonia agree in this that hydrogen in *statu nascendi* and steam in excess must always be present. The former combines with the nitrogen, which has become disengaged from the organic compounds, the latter serves for the protection of the ammonia formed. As a source of hydrogen during the process of gasifying the coke, on the one hand the hydrogen which is contained in the coke is available, while on the other hand hydrogen is formed by the action of steam on coke or carbonic oxide respectively according to the following equations:

$$C + 2H_2O = CO_2 + H_4$$
$$C + H_2O = CO + H_2$$
$$CO + H_2O = CO_2 + H_2.$$

Carbonic acid not being reduced by hydrogen, a considerable excess of hydrogen is insured, so that the generator gas which results in the process of gasification contains as much as 20—30 per cent, in volume, of hydrogen, and as the formation of hydrogen is connected with a considerable absorption of heat it becomes possible to keep the generator at a relatively low temperature, whereby not only the dissociation of ammonia is prevented, but also the excess of heat which is developed on gasifying the coke can be profitably applied for keeping up the process of charring. These are now the theoretical principles on which the new process depends.

Figure 5:
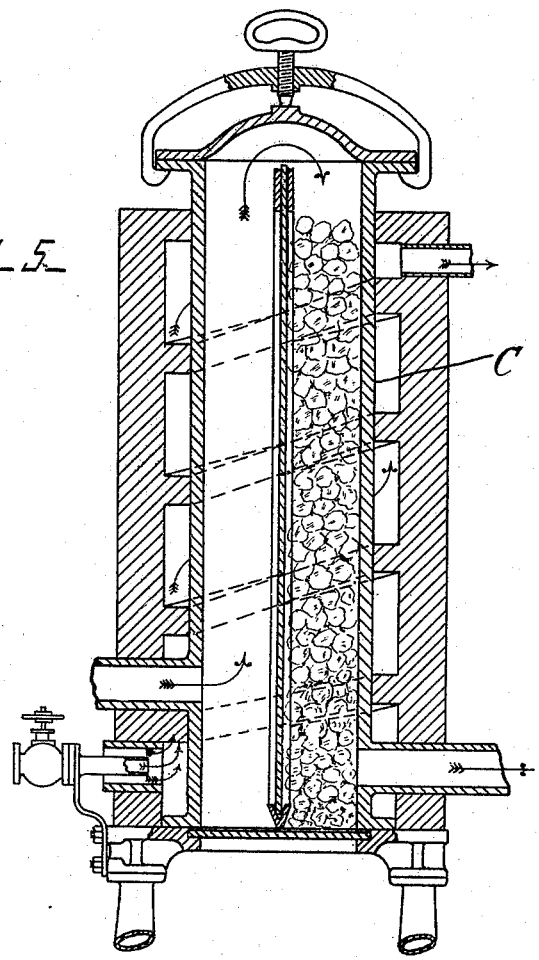
Figure 6:
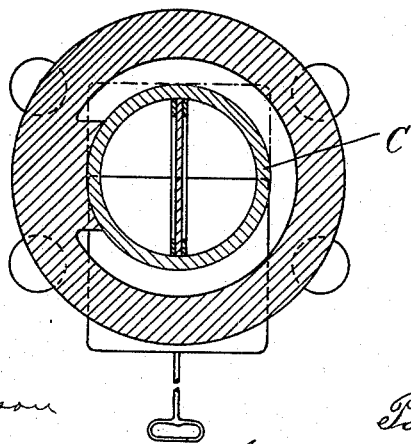

In the drawings: Figure 1 is a vertical sectional section through the carbonizer. Fig. 2$^a$ and 2$^b$ are a sectional side view of the entire apparatus, shown in two parts to display it on a single sheet. Fig. 3 is a detail sectional side view of some of the overlapping rings of the carbonizer. Fig. 4 is a plan view of the same. Fig. 5 is a detail sectional side view of the retort C; and Fig. 6 is a cross-section through the same.

It now becomes the inventor to state the method of carrying out the process in practice. The first step is the air-drying of the substance of moors or the turf respectively. If unfavorable local circumstances prevent the draining of the peat-bogs, peat-presses are employed for removing the excess of moisture. The peat-mass is then freed from the vegetable matter lying above and worked by means of plows and harrows into a homogeneous mass, which under the influence of sun and wind loses its adhering moisture within two—three hours up to nearly thirty—forty per cent. As soon as the upper layer is dry, it is scraped together by means of a machine and brought from the moor on to the platform of the charring furnace. The layer of peat which lies below that layer which has just been removed, is subjected to the same treatment and the winning of the raw material thus proceeds horizontally in a regular manner. The drying of the peat to powder in the air and sun allows of great quantities of peat being quickly and cheaply worked and consequently of an extensive production. The powdery shape of the peaty substance promotes the charring and the gasifying process inasmuch, as the small particles of the coke offer sufficient points of attack to the air and favor the combination of nitrogen and hydrogen in *statu nascendi*. If the nitrogenous raw material has the property to bake in the heat, it is preferable to mix it with coal-dust or slack. The air-dry peat is then emptied for its treatment proper into an apparatus of which Fig. 1 in the accompanying drawings represents the furnace serving for the dry distillation and the gasification, whereas Fig. 2 shows an example of a total plant, as it can be used in the practical carrying out of the process. The air-dry peat is placed in the charring portion A of the furnace. In this portion of the furnace the peat is subjected to drying at a high temperature. The portion A of the furnace which serves for charring is similar in construction to the apparatus used in the distillation of brown-coal. The shell of the furnace is surrounded by flues $k$ $k$ for the admission of the heating gases, while in the inside of the furnace a central space or receptacle V is formed by means of a series of superposed conical or bell-shaped rings $g$ one put on the top of the other. The object of the space V thus created is to allow of the escape of the vapors formed, while the material to be dried cannot find an entrance into the inside of this empty space V. In the upper portion of the space a horizontal partition $a$ is fixed, which, as it were, separates the drying zone from the charring zone lying below. The rings $g$ are supported by a central rod 20 secured in the furnace. The rings $g$ are kept at the desired distance apart by the lugs 21, and certain of the rings have arms 22 connected to the lugs 21, and to bosses 23 which are secured to the said rod 20 at different parts of its length so that the weight of all the rings does not come upon the lowest rings. The aqueous vapors developed in the drying zone pass through openings above the partition $a$ into the empty space and are then aspirated through a pipe S in order to be employed in another stage of the same process. The vapors of the charring zone on the other hand, are aspirated through a pipe B at the bottom of the charring furnace. The object of the partition $a$ inside the empty space is therefore the separation of the aqueous vapors of the peat from the mixture of tarry and nitrogenous vapors which are given off during the process of charring. The dried peat after passing the drying zone proceeds vertically downward into the charring zone, where it is subjected to a dry distillation and then passing down the conical neck W of the furnace, reaches the generator G which lies below the charring furnace.

As seen from the total plant represented in Fig. 2, the tarry and nitrogenous vapors from the charring furnace, which are aspirated through a pipe B at the bottom of the charring furnace, first pass into a retort C, which is filled with calcareous porous tar-coke and which is heated to a light red state by means of heating gases, which are produced in the process itself. The vapors which reach this hot retort C, are decomposed by means of the heat and the contact with the hightly heated porous substances. The products of decomposition obtained mainly consist of tar, ammonia and permanent combustible gases. These pass first through a hydraulic main D, where the tar is deposited, then through a water-scrubber E for separating tarry matters which have been driven along with the current of gas and for removing fixed ammonia compounds, then through an acid-scubber E' for absorbing volatile ammonia, and lastly through an oil-scrubber F of approved construction. The resulting gases are blown by way of a pipe X into the fire place of the retort C. The coke which passes from the charring zone into the generator G yields, and gasifying with air and steam, gases which are rich in ammonia and are carried away through a pipe H from the generator G. These gases, which are hot and serve for heating the air surrounding the pipes I I in the chamber L, first pass through the pipes I I and then travel into a base K which is partially filled with water and where by means of any approved agitating or spraying devices the gases and the water are brought into intimate contact. The gases thereby cool down to 100° centigrade. The aqueous solution is run off from time to time and the ammonia recovered from it by means of distillation with lime. The gases thus cooled down to 100° centigrade then pass through an acid-scrubber Q where all the ammonia is absorbed by being combined with sulphuric acid. The addition of sulphuric acid is so regulated that the gases only cool down by a few degrees so that only a small quantity of steam condenses to water. In order to render these gases, which are saturated with moisture, suitable for heating purposes, they are after being freed from ammonia, dried by cooling. This is done in this way, that they are made to pass a second scrubber R, which is fed with water, whereby the water cools down to 30° centigrade. The cooled gases are aspirated through a pipe O and blown by means of a fan Y into the fire place of the charring cylinder. The cooling water which runs off from the scrubber R is pumped on the top of another scrubber T, where as it runs down, meets a current of air produced by a fan Z and which rises upward in the opposite direction. The air is thereby warmed to from 70°—80° centigrade and saturated with moisture at this temperature.

The water thus cooled down is again used in the scrubber R. The warm and moist current of air escaping from the scrubber T through the pipe M is heated by a regenerative system to 200°—300° centigrade and after being mixed with superheated steam, is finally blown under the step grate N of the generator. The aqueous vapors which escape from the generator through the pipe S are also discharged under the step-grate N, and preferably through the same opening as the hot air escaping through the pipe M. The removing of the ashes from the generator is done by means of a worm U without interruption and is regulated according as the coke is gasified. The angle of inclination of the step-grate N is so chosen that the coke from the charring cylinder sinks downward as uniformly as possible, so that the peat, which lies between the walls of the charring furnace and the space V in the inside of the furnace can also find its way downward with uniformity, whereby the process becomes a continuous one; the time for charring the peat and gasifying the coke being so regulated that they conform to each other. The process as described and the apparatus as used in conjunction with the process is not only suitable for the utilization of nitrogen in peat or turf-substances, but can also find application for all nitrogenous organic substances. It is specially characterized by the facts, that the vapors and volatile nitrogenous compounds which escape on drying and charring, are carried away and treated separately, whereas the residue of the charring process is gasified by means of heated air and steam in order to convert the nitrogen into ammonia, which ammonia is carried away and absorbed separately in order to recover the ammonia in a pure state.

What I claim is—

1. The process of making ammonia and tar, which consists in drying and calcining nitrogenous material—such as peat, to drive off separately the aqueous and tarry vapors, passing the tarry vapors through incandescent material, thereby forming tar, ammonia and combustible gas, the said incandescent material being heated by the said combustible gas; and simultaneously treating the calcined material with heated air and the said aqueous vapor to form ammonia and heating gases, the said heating gases being utilized for heating the said air and calcining the said nitrogenous material, substantially as set forth.

2. The combination, with the calcining furnace provided with a central receptacle consisting of a series of overlapping rings $g$ having the partition $a$ and pipes at its upper and lower ends for the collection and removal of vapors, of a generator provided with an inclined grate arranged directly beneath the said furnace, and an inlet for moist heated air below the said grate, whereby the calcined material is fed from the furnace in a uniform stream to the generator by gravity, and is gasified upon the said grate, substantially as set forth.

3. The combination, with the shell of the calcining furnace, of a central receptacle formed of a series of overlapping rings each provided with lugs 21 and certain of the rings having also the arms 22 and bosses 23 and the said receptacle being divided into two parts by the horizontal partition a, arranged at that part of the furnace where the drying of the material ceases and the calcining action begins, the central supporting rod secured to the said bosses, and pipes connected to the upper and lower ends of the said receptacle for the escape of the aqueous and tarry vapors respectively, substantially as set forth.

In testimony whereof I affix my signature in presence of two subscribing witnesses.

PAUL KUNTZE.

Witnesses:
WERNER VON DER LEHE,
SIEGFRIED HAMBURGER.